US011639669B2

(12) United States Patent
Drozd et al.

(10) Patent No.: US 11,639,669 B2
(45) Date of Patent: May 2, 2023

(54) SYSTEMS AND METHODS FOR SELECTIVELY DISCONNECTING EMBEDDED ELECTRICAL MACHINES IN GAS TURBINE ENGINES

(71) Applicants: General Electric Company, Schenectady, NY (US); General Electric Company Polska sp. z o.o., Warsaw (PL); General Electric Deutschland Holding GmbH, Frankfurt (DE)

(72) Inventors: Bartlomiej Drozd, Otrebusy (PL); Miroslaw Sobaniec, Grodzisk Mazowiecki (PL); Mohamed Osama, Garching (DE); Darek Zatorski, Fort Wright, KY (US)

(73) Assignees: GENERAL ELECTRIC COMPANY, Schenectady, NY (US); GENERAL ELECTRIC COMPANY POLSKA SP. Z O.O., Warsaw (PL); GENERAL ELECTRIC DEUTSCHLAND HOLDING GMBH, Frankfurt (DE)

(*) Notice: Subject to any disclaimer, the term of this patent is extended or adjusted under 35 U.S.C. 154(b) by 18 days.

(21) Appl. No.: 17/170,211

(22) Filed: Feb. 8, 2021

(65) Prior Publication Data
US 2022/0251964 A1 Aug. 11, 2022

(51) Int. Cl.
*F01D 15/10* (2006.01)
*F01D 21/14* (2006.01)
(Continued)

(52) U.S. Cl.
CPC ............. *F01D 15/10* (2013.01); *F01D 21/14* (2013.01); *F02C 7/36* (2013.01); *F01D 25/28* (2013.01);
(Continued)

(58) Field of Classification Search
CPC .......... F01D 15/10; F01D 21/14; F01D 25/28; F02C 7/36; F02C 7/275; F05D 2220/76;
(Continued)

(56) References Cited

U.S. PATENT DOCUMENTS 2,862,375 A 12/1958 Miller
2,964,931 A 12/1960 Sorenson
(Continued)

FOREIGN PATENT DOCUMENTS

EP 3589832 A1 1/2020

*Primary Examiner* — Gerald L Sung
*Assistant Examiner* — Rene D Ford
(74) *Attorney, Agent, or Firm* — Venable LLP; Peter T. Hrubiec; Michele V. Frank

(57) ABSTRACT

A gas turbine engine includes an electrical machine positioned at least partially inward of a core airflow path, the electrical machine including an electrical rotor component and an electrical stator component, a connecting member positioned between the electrical machine and a rotary member, a disconnection device that is positionable between a disengaged position, in which the disconnection device is disengaged from the connecting member, and an engaged position, in which the disconnection device is engaged with the connecting member, and a controller including a processor, where the processor receives a signal from the electrical machine indicative of a fault, and in response to receiving the signal from the electrical machine indicative of the fault, directs the disconnection device to move from the disengaged position to the engaged position.

23 Claims, 12 Drawing Sheets

(51) Int. Cl.
*F02C 7/36* (2006.01)
*F01D 25/28* (2006.01)
*F02C 7/275* (2006.01)

(52) U.S. Cl.
CPC .......... *F02C 7/275* (2013.01); *F05D 2220/76* (2013.01); *F05D 2260/311* (2013.01); *F05D 2260/80* (2013.01); *F05D 2270/09* (2013.01); *F05D 2270/335* (2013.01)

(58) Field of Classification Search
CPC .......... F05D 2260/311; F05D 2260/80; F05D 2270/09; F05D 2270/335
See application file for complete search history.

(56) References Cited

U.S. PATENT DOCUMENTS

| | | |
|---|---|---|
| 3,968,414 A * | 7/1976 | Konrad .................... B60L 3/00 318/139 |
| 4,392,835 A | 6/1983 | Siddiqui et al. |
| 4,932,280 A | 6/1990 | Becker et al. |
| 5,418,412 A | 5/1995 | Brucker |
| 6,212,974 B1 | 4/2001 | Van Duyn |
| 8,122,781 B2 | 2/2012 | Minke et al. |
| 8,456,051 B2 | 6/2013 | Raad |
| 9,650,964 B2 | 5/2017 | Huang et al. |
| 10,131,441 B2 | 11/2018 | Edwards et al. |
| 10,190,439 B2 | 1/2019 | Korshikov et al. |
| 10,316,898 B2 | 6/2019 | Wirsch, Jr. et al. |
| 10,584,640 B2 | 3/2020 | Rodriguez et al. |
| 2013/0054043 A1* | 2/2013 | Klodowski .......... G01R 31/343 713/320 |
| 2017/0219019 A1* | 8/2017 | Wirsch, Jr. .............. F02C 7/277 |
| 2018/0051701 A1* | 2/2018 | Kupiszewski ....... H02K 7/1823 |
| 2020/0003157 A1* | 1/2020 | Clements ................ F01D 5/225 |
| 2020/0096062 A1* | 3/2020 | Smith ..................... F16D 48/02 |
| 2020/0216184 A1 | 7/2020 | Puech et al. |

* cited by examiner

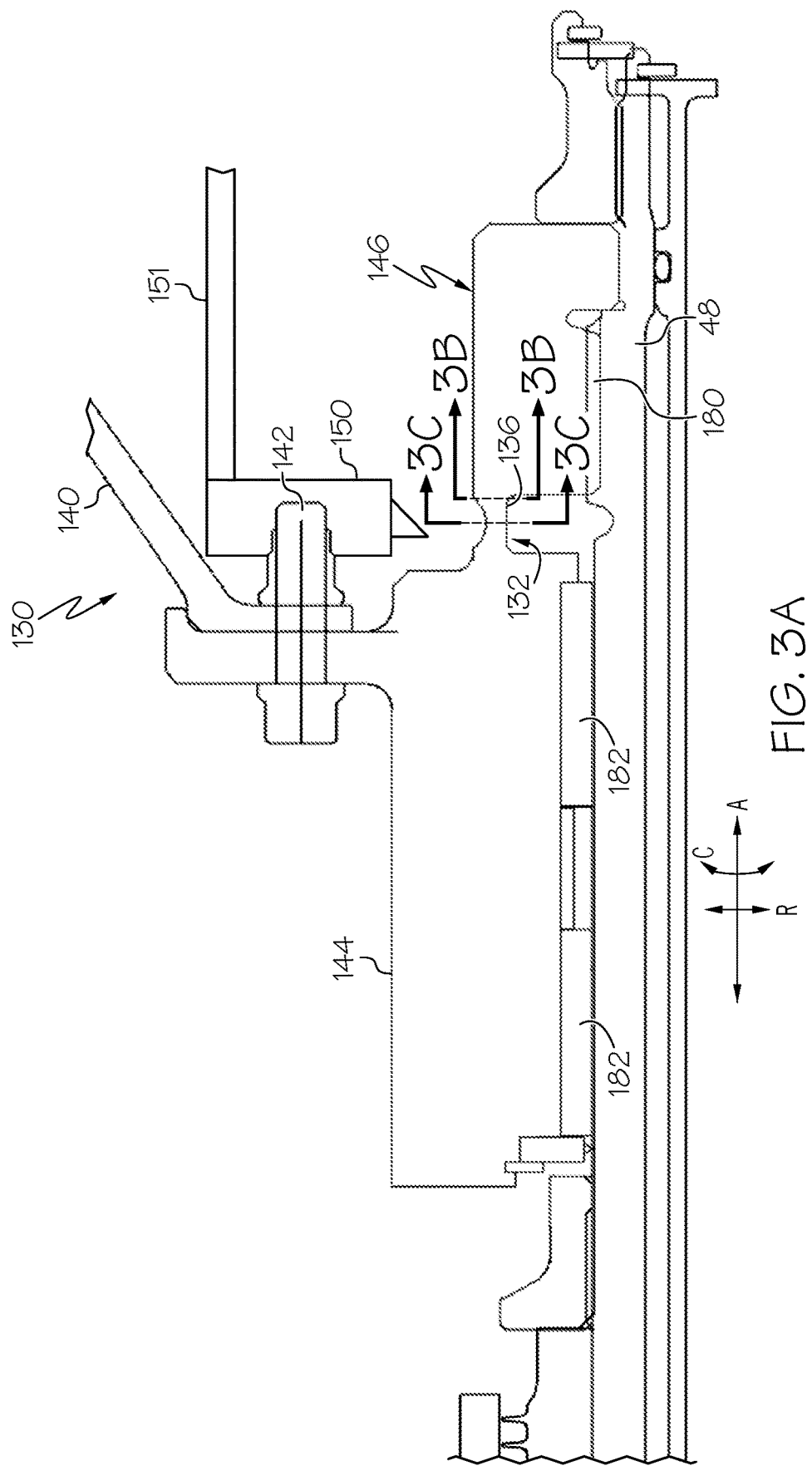

SYSTEMS AND METHODS FOR SELECTIVELY DISCONNECTING EMBEDDED ELECTRICAL MACHINES IN GAS TURBINE ENGINES

FIELD

The present specification generally relates to gas turbine engines and, more specifically, to gas turbine engines that include embedded electrical machines.

TECHNICAL BACKGROUND

Gas turbine engines are frequently used as part of aircraft propulsion systems. Gas turbine engines may include a compressor section, a combustion section, a turbine section and an exhaust section. Air is provided by a fan to the compressor section where the air is compressed and delivered to the combustion section. In the combustion section, the air is mixed with fuel and then burned. The combustion gases are then delivered to the turbine section, which drives the turbine section before delivering the combustion gases to the exhaust section.

SUMMARY

Gas turbine engines may include a rotary member that rotates within the compressor section and the turbine section. For example, the combustion gases passing through the turbine section may drive the rotary member, thereby causing the rotary member to rotate. Rotation of the rotary member within the compressor section may generally compress the air delivered to the combustion section.

In some configurations, electrical machines may be embedded within the gas turbine engine. The electrical machines may include one or more electrical rotor members coupled to rotary member. As the rotary member rotates, the rotary member may cause the one or more electrical rotor members to rotate with respect to one or more electrical stator members. The rotation of the one or more electrical rotor members with respect to the one or more electrical stator members may generate electricity, which can power various devices in an aircraft. For example, in some configurations, electrical power generated by the electrical machines may be used to operate an accessory propulsor (e.g., an electric fan, motor, or the like) to supplement thrust provided via the turbine engine.

However, in some circumstances, the electrical machine may have a fault, such as a short circuit. In such circumstances, the electrical machine may impart a torque on the rotary member, which is undesirable for a number of reasons. In such circumstances, it is desirable to disconnect the electrical machine from the rotary member so as to minimize the impact of the fault in the electrical machine on the operation of the gas turbine engine. Embodiments of the present disclosure are generally directed to systems and methods for disconnecting embedded electrical machines from a rotary member of a gas turbine engine.

According to an embodiment of the present disclosure, a gas turbine engine includes a compressor section and a turbine section arranged in serial flow order, the compressor section and the turbine section together defining a core airflow path, a rotary member rotatable within at least a portion of the compressor section and with at least a portion of the turbine section, a fan coupled to the rotary member, an electrical machine positioned at least partially inward of the core airflow path in a radial direction, the electrical machine including an electrical rotor component and an electrical stator component, where the electrical rotor component is coupled to the rotary member, a connecting member positioned between the electrical machine and the rotary member, where the connecting member couples the electrical rotor component to the rotary member, a disconnection device that is positionable between a disengaged position, in which the disconnection device is disengaged from the connecting member, and an engaged position, in which the disconnection device is engaged with the connecting member, and a controller communicatively coupled to the electrical machine and the disconnection device, the controller including a processor and a computer readable and executable instruction set, which, when executed, causes the processor to receive a signal from the electrical machine indicative of a fault, and in response to receiving the signal from the electrical machine indicative of the fault, direct the disconnection device to move from the disengaged position to the engaged position, thereby disconnecting the electrical rotor component from the rotary member.

According to another embodiment of the present disclosure, a gas turbine engine includes a compressor section and a turbine section arranged in serial flow order, the compressor section and the turbine section together defining a core airflow path, a rotary member rotatable within at least a portion of the compressor section and with at least a portion of the turbine section, a fan coupled to the rotary member, an electrical machine positioned at least partially inward of the core airflow path in a radial direction, the electrical machine includes an electrical rotor component and an electrical stator component, where the electrical rotor component is coupled to the rotary member, a connecting member positioned between the electrical machine and the rotary member, where the connecting member couples the electrical rotor component to the rotary member, where the connecting member includes a frangible connection portion and a nominal connection portion, where the frangible connection portion is structurally configured to fracture upon the application of a predetermined force, and where the frangible connection portion defines a frangible material strength that is less than a nominal material strength of the nominal connection portion.

According to another embodiment of the present disclosure, a method for operating a gas turbine engine includes rotating a rotary member within at least a portion of a compressor section and with at least a portion of a turbine section that are arranged in serial flow order and define a core airflow path, thereby rotating a fan coupled to the rotary member, and an electrical rotor component of an electrical machine, where the electrical rotor component is coupled to the rotary member, and where the electrical machine is positioned at least partially inward of the core airflow path in a radial direction, and the electrical machine includes the electrical rotor component and an electrical stator component, detecting a fault within the electrical machine, and in response to detecting the fault within the electrical machine, disconnecting a connecting member that couples the electrical rotor component to the rotary member with a disconnection device, thereby disconnecting the electrical rotor component from the rotary member.

Additional features, embodiments and advantages of the gas turbine engines and methods of their use described herein will be set forth in the detailed description which follows, and in part will be readily apparent to those skilled in the art that such features, embodiments and advantages are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter described and claimed herein. The accompanying drawings are included to provide a further understanding of the various embodiments, and are incorporated into and constitute a part of this specification. The drawings illustrate the various embodiments described herein, and together with the description serve to explain the principles and operations of the subject matter described and claimed herein.

BRIEF DESCRIPTION OF THE DRAWINGS

FIG. 3A schematically depicts an enlarged section view of another connecting member, according to one or more embodiments shown and described herein;

DETAILED DESCRIPTION

Embodiments described herein are generally directed to gas turbine engines that include embedded electrical machines. The embedded electrical machines may generally include electrical rotor components that are driven by a rotary member of the gas turbine engine. However, in the instance of some faults in the electrical machines, the electrical rotor components may apply a torque to the rotary member, which may be undesirable for a number of reasons. Embodiments of the present disclosure are directed to systems and methods for disconnecting an embedded electrical machine from a rotary member, for example, in the instance of a fault of the electrical machine.

Figure 1:
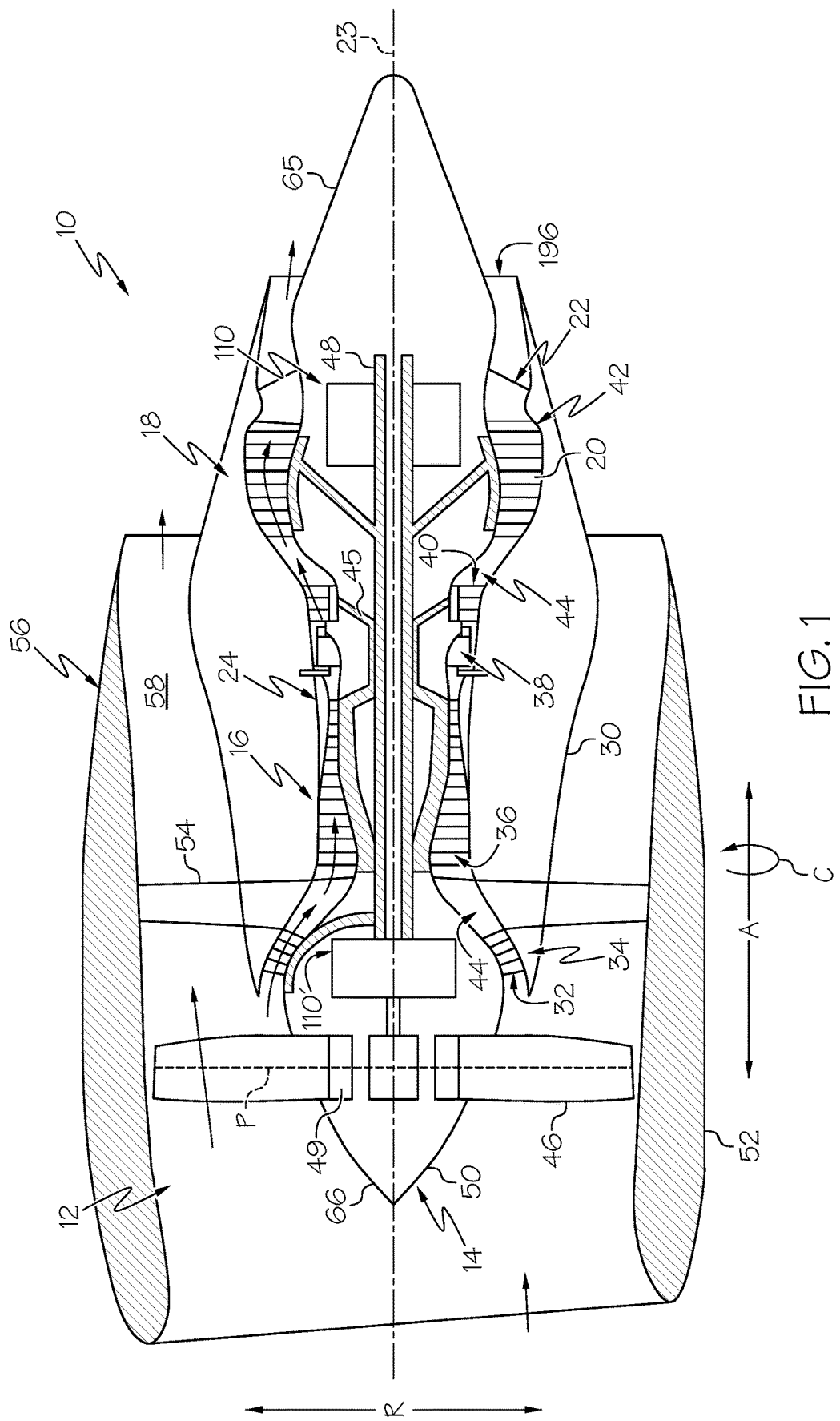
FIG. 1 schematically depicts a section view of a gas turbine engine including an electrical machine, according to one or more embodiments shown and described herein.

Referring to FIG. 1, an exemplary gas turbine engine 10 may be configured for wing or fuselage mounting on an aircraft. The gas turbine engine 10 includes a fan section 12 including a fan 14, a compressor section 16 and a turbine section 18. The fan section 12, compressor section 16 and turbine section 18 may include one or more rotor disks 20 that include rotor blades extending radially therefrom. Air is drawn into the gas turbine engine 10 and accelerated by the fan 14. The air, or at least a portion thereof, is compressed in the compressor section 16 and is delivered to a combustion chamber where the air is mixed with fuel and combusted, thereby generating hot combustion gas. The combustion gases pass through the turbine section 18, which extracts mechanical work from the combustion gases to cause the attached compressor section 16 to turn and thereby further compress the upstream air to produce a self-sustaining process. The combustion gas is exhausted through a nozzle section 22.

The gas turbine engine 10 defines an axial direction A that extends parallel to a longitudinal centerline 23, a radial direction R that extends perpendicular to the axial direction A, and a circumferential direction C that extends about the axial direction A. The gas turbine engine 10 includes the fan section 12 and a core section 24 that is located downstream of the fan section 12 in the axial direction.

The gas turbine engine 10 includes a tubular core cowl 30 that defines, at least in part, an annular inlet 32. The core cowl 30 encases, in serial flow relationship, the compressor section 16 including a booster or low pressure (LP) compressor 34 and a high pressure (HP) compressor 36; a combustion section 38 that includes the combustion chamber; the turbine section 18 including a high pressure (HP) turbine 40 and a low pressure (LP) turbine 42; and the jet exhaust nozzle section 22. The compressor section 16, the combustion section 38, and the turbine section 18 together define a core airflow path 44 extending from the annular inlet 32 through the LP compressor 34, the HP compressor 36, the combustion section 38, and the HP turbine 40. A first rotary member or shaft 45 drivingly connects the HP turbine 40 to the HP compressor 36. A second rotary member or shaft 48 drivingly connects the LP turbine 42 to the LP compressor 34 and the fan 14.

The fan section 12 includes the fan 14 having a plurality of fan blades 46 coupled to a disk 49 in a spaced apart manner. The fan blades 46 extend outwardly from disk 49 generally along the radial direction R. The disk 49 is covered by rotatable front hub 50 that is aerodynamically contoured to promote an air flow through the plurality of fan blades 46. The exemplary fan section 12 includes an annular fan casing or outer nacelle 52 that circumferentially surrounds the fan 14 and/or at least a portion of the core section 24. The outer nacelle 52 is supported relative to the core section 24 by a plurality of circumferentially-spaced struts that also serve as outlet guide vanes 54. A downstream section 56 of the outer nacelle 52 extends over an outer portion of the nacelle to define a bypass airflow passage 58 therebetween.

The gas turbine engine 10 includes an electrical machine 110 that is rotatable with second shaft 48 and/or the first shaft 45 and is located at least partially within a tail cone 65 rearward of the compressor section 16 in the axial direction A. In some embodiments, the electrical machine 110 may be a generator or the like that may generate electrical current. In some embodiments, the electrical machine 110 may be a motor or the like. The electrical machine 110, in some embodiments, co-axially mounted to and rotatable with the second shaft 48. While the electrical machine 110 is described and depicted as being coupled to the second shaft 48, in some embodiments, the electrical machine 110 may be coupled to and rotatable with the first shaft 45.

In some embodiments, the electrical machine 110 is an aft electrical machine 110, and the gas turbine engine 10 may additionally or alternatively include a forward electrical machine 110'. The forward electrical machine 110' may be located at least partially within a forward cone 66 positioned forward of the turbine section 18 in the axial direction A. In embodiments, the forward electrical machine 110' is co-axially mounted to and rotatable with the second shaft 48. While the forward electrical machine 110' is described and depicted as being coupled to the second shaft 48, in some embodiments, the electrical machine 110 may be coupled to and rotatable with the first shaft 45.

The gas turbine engine 10 depicted in FIG. 1 is provided by way of example only. In other exemplary embodiments the gas turbine engine 10 may be replaced with other types of gas turbine engines utilizing an embedded electrical machine without loss of clarity. Examples include a turboprop engine, a turbojet engine, an open rotor, or inducted fan engine.

Figure 2:
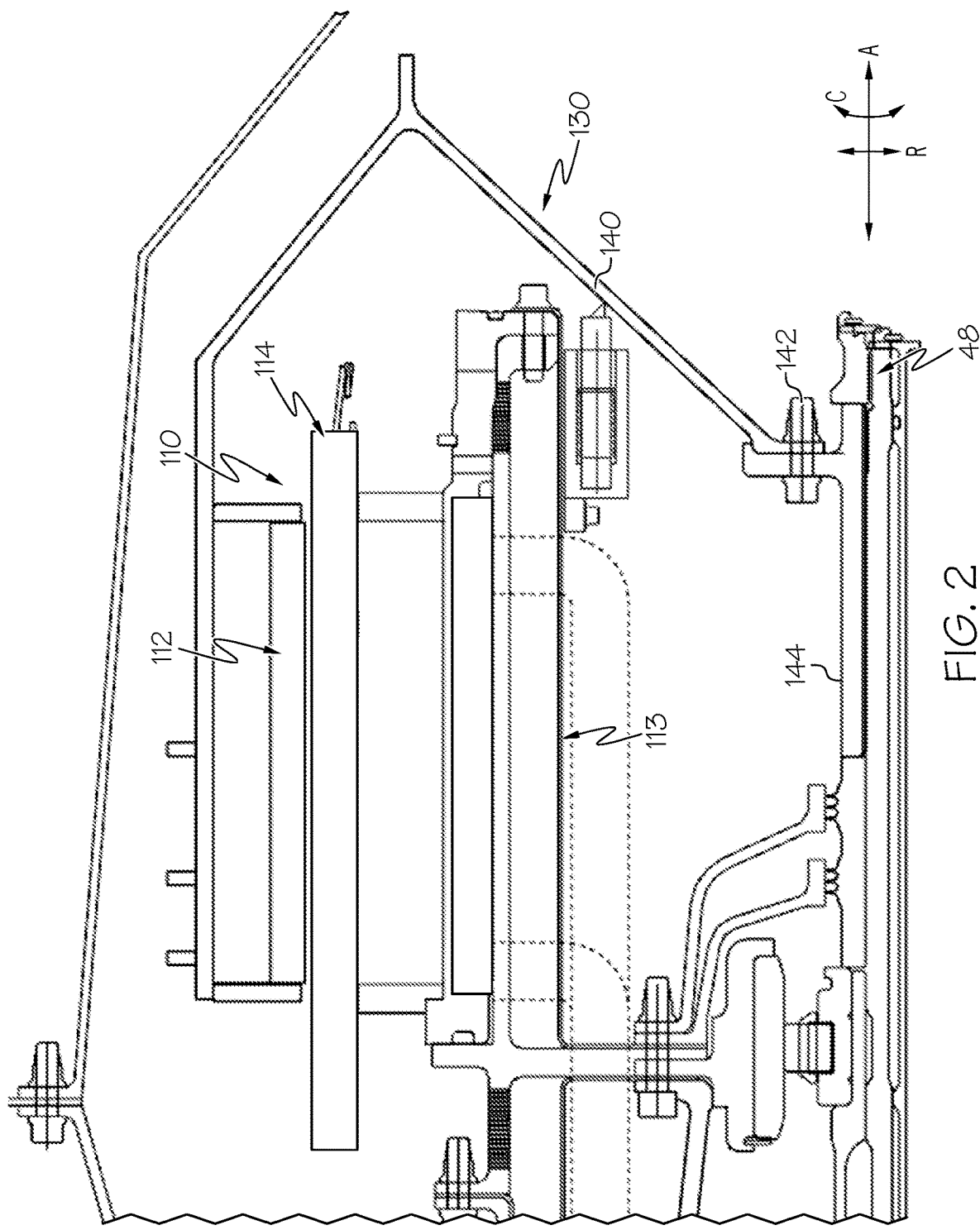
FIG. 2 schematically depicts a section view of an aft portion of the gas turbine engine of FIG. 1 including an electrical machine and a connecting member coupled to a rotary member, according to one or more embodiments shown and described herein.

Referring to FIG. 2, an enlarged section view of the aft electrical machine 110 is schematically depicted. In embodiments, the electrical machine 110 generally includes an electrical rotor component 112 and an electrical stator component 114. In embodiments, the electrical rotor component 112 may include one or more magnets or the like, and the electrical stator component 114 may include one or more wire coils. The one or more magnets of the electrical rotor component 112 may cooperate with the one or more wire coils of the electrical stator component 114 to generate electricity as the electrical rotor component 112 rotates about the electrical stator component 114 in the circumferential direction C.

In the embodiment depicted in FIG. 2, the electrical stator component 114 is supported on a stator support structure 113. The electrical rotor component 112, in embodiments, is coupled to the second shaft 48, such that the electrical rotor component 112 rotates as the second shaft 48 rotates in the circumferential direction C. While in the embodiment depicted in FIG. 2 the electrical rotor component 112 is depicted as being coupled to the second shaft 48, it should be understood that this is merely an example, and the electrical rotor component 112 may be coupled to the first shaft 45 (FIG. 1).

In embodiments, the gas turbine engine 10 includes a connecting member 130 positioned between the electrical machine 110 and the second shaft 48, and the connecting member 130 couples the electrical rotor component 112 to the second shaft 48. In the embodiment depicted in FIG. 2, the connecting member 130 includes a connecting arm 140 extending between the electrical rotor component 112 and a shaft connection member 144. The connecting arm 140 may be coupled to the shaft connection member 144, for example, through a fastener 142 or the like. While the connecting arm 140 and the shaft connection member 144 are depicted as being separate components, it should be understood that in some embodiments, the connecting arm 140 and the shaft connection member 144 may be monolithic.

Referring to FIG. 3A, an enlarged section view of another connecting member 130 and the second shaft 48 is schematically depicted. In some embodiments, the connecting member 130 includes the shaft connection member 144 and an arm connection member 146 that couple the connecting member 130 to the second shaft 48. For example, in the embodiment depicted in FIG. 3A, the gas turbine engine 10 may include a spline 180 or the like positioned between the second shaft 48 and the arm connection member 146, such that as the second shaft 48 rotates in the circumferential direction C, the second shaft 48 causes the arm connection member 146 to rotate in the circumferential direction C.

In the embodiment depicted in FIG. 3A, the gas turbine engine 10 may include one or more bearings 182 positioned between the shaft connection member 144 and the second shaft 48. The connecting member 130, in the embodiment depicted in FIG. 3A, includes a frangible connection portion 132 positioned between and coupling the shaft connection member 144 to the arm connection member 146. In the embodiment depicted in FIG. 3A, the connecting member 130 further includes a nominal connection portion 136 adjacent to the frangible connection portion 132. In embodiments, the frangible connection portion 132 is structurally configured to fracture upon the application of a predetermined force. The frangible connection portion 132, in embodiments, may define a frangible material strength that is less than a nominal material strength of the nominal connection portion 136.

Figure 3B:
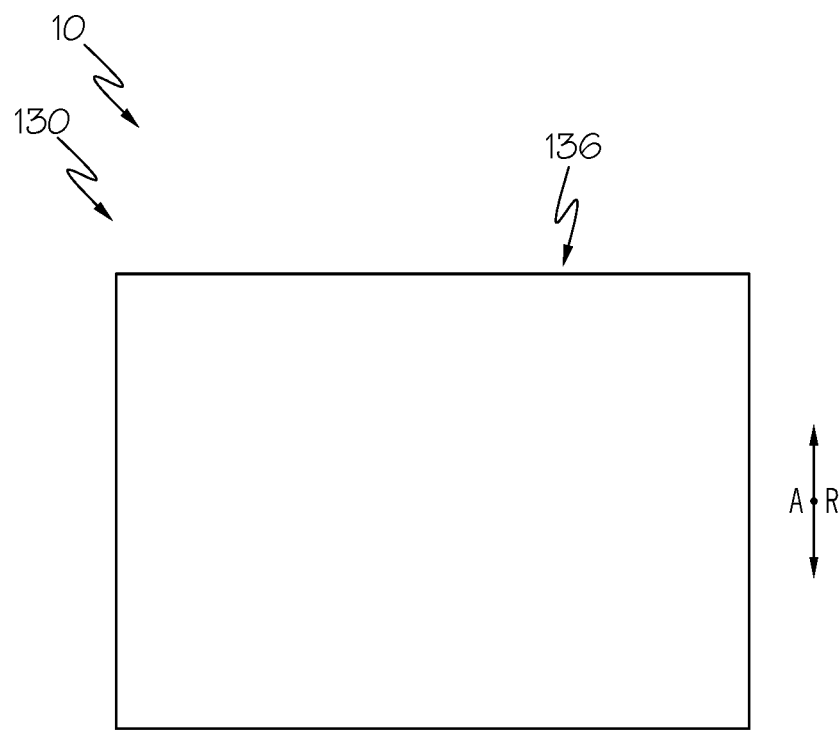
FIG. 3B schematically depicts a section view of the connecting member along section 3B-3B of FIG. 3A, according to one or more embodiments shown and described herein.
Figure 3C:
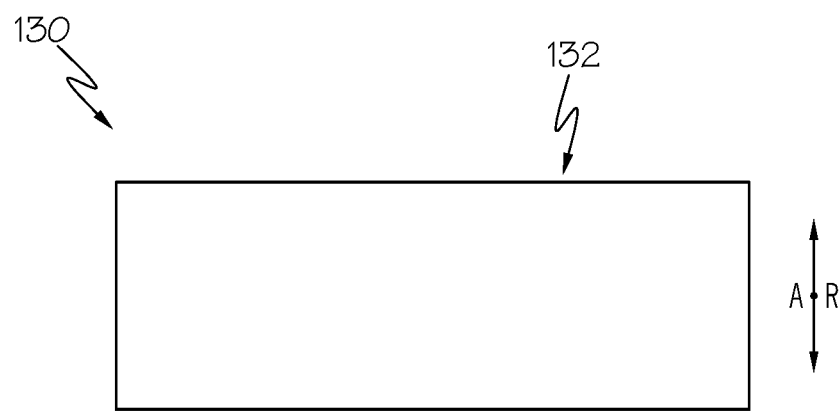
FIG. 3C schematically depicts a section view of the connecting member along section 3C-3C of FIG. 3A, according to one or more embodiments shown and described herein.

For example and referring to FIGS. 3A, 3B, and 3C, a section view of the nominal connection portion 136 along section 3B-3B of FIG. 3A and a section view of the frangible connection portion 132 along section 3C-3C of FIG. 3A are schematically depicted. In the embodiment depicted in FIGS. 3A-3C, the frangible connection portion 132 defines a frangible connection portion cross-sectional area and the nominal connection portion 136 defines a nominal connection portion cross-sectional area. As shown in FIGS. 3A-3C, in embodiments, the frangible connection portion cross-sectional area is less than the nominal connection portion cross-sectional area. Because the frangible connection portion cross-sectional area is less than the nominal connection portion cross-sectional area, a shear strength of the frangible connection portion 132 may be less than a shear strength of the of the nominal connection portion 136.

In operation, the frangible connection portion 132 may fracture upon the application of a shear force acting on the frangible connection portion 132 (e.g., in the circumferential direction C) associated with a torque acting on the electrical rotor component 112 (FIG. 1). For example and referring to FIGS. 1 and 3A, in some instances, the electrical machine 110 may fail, for example by having an open circuit fault, a short circuit fault, or the like. In some failure modes, it is desirable to disconnect the second shaft 48 from the electrical machine 110. For example and without being bound by theory, in the instance of some short circuit faults, magnetic flux may continue to induce current as the electrical rotor component 112 rotates about the electrical stator component 114, even if the electrical machine 110 is electrically isolated (e.g., via the current detection device 152 embodied as a circuit breaker). The induced currents may apply torque on the electrical rotor component 112 as the electrical rotor component 112 rotates in the circumferential direction C. This torque applies a shear force on the connecting member 130 that couples the electrical rotor component 112 to the first shaft 45, and can thereby apply force to the second shaft 48. The force applied to second shaft 48 as a result of the torque acting on the electrical rotor component 112 may resist rotation of the second shaft 48, which can impact the operation of the gas turbine engine 10. Accordingly, in some fault modes, such as short circuit faults, it is desirable to disconnect the electrical rotor component 112 from the second shaft 48.

In embodiments, the frangible connection portion 132 may be structurally configured to fracture upon the application of a predetermined force associated with a torque acting on the electrical rotor component 112 as the result of a short circuit fault. However, the predetermined force may be selected so as to avoid fracture of the frangible connection portion 132 during normal operation of the gas turbine engine 10. For example, in some embodiments, the frangible connection portion 132 may be structurally configured to fracture upon the application of a predetermined force (e.g., a shear force applied in the circumferential direction C) of about 14 Newtons. In some embodiments, the frangible connection portion 132 may be structurally configured to fracture upon the application of a predetermined force (e.g., a shear force applied in the circumferential direction C) of about 18 Newtons. In some embodiments, the frangible connection portion 132 may be structurally configured to fracture upon the application of a predetermined force (e.g., a shear force applied in the circumferential direction C) of about 20 Newtons. In some embodiments, the frangible connection portion 132 may be structurally configured to fracture upon the application of a predetermined force (e.g., a shear force applied in the circumferential direction C) of about 30 Newtons. In some embodiments, the frangible connection portion 132 may be structurally configured to fracture upon the application of a predetermined force (e.g., a shear force applied in the circumferential direction C) of about 40 Newtons. In some embodiments, the frangible connection portion 132 may be structurally configured to fracture upon the application of a predetermined force (e.g., a shear force applied in the circumferential direction C) of about 140 Newtons. In some embodiments, the frangible connection portion 132 may be structurally configured to fracture upon the application of a predetermined force (e.g., a shear force applied in the circumferential direction C) of about 300 Newtons. In some embodiments, the frangible connection portion 132 may be structurally configured to fracture upon the application of a predetermined force (e.g., a shear force applied in the circumferential direction C) of about 400 Newtons.

Upon the fracture of the frangible connection portion 132, the arm connection member 146 is disconnected from the shaft connection member 144 of the connecting member 130. Because the electrical rotor component 112 is connected to the second shaft 48 through the connecting member 130, upon the fracture of the frangible connection portion 132, the electrical rotor component 112 is disconnected from the second shaft 48. In the embodiment depicted in FIG. 3A, as the second shaft 48 continues to rotate in the circumferential direction C, the arm connection member 146 may continue to rotate with the second shaft 48. However, because the arm connection member 146 is disconnected from the shaft connection member 144, the shaft connection member 144 is no longer driven to rotate in the circumferential direction C by the second shaft 48. Because the shaft connection member 144 is no longer driven to rotate in the circumferential direction C, the connecting arm 140, and the electrical rotor component 112 are no longer driven to rotate in the circumferential direction C, and the electrical rotor component 112 is no longer driven to rotate about the electrical stator component 114. As such, the electrical rotor component 112 and the electrical stator component 114 may generate no or minimal current with the electrical rotor component 112 disconnected from the second shaft 48, and may thereby apply minimal or no resistance to the rotation of the second shaft 48 such that the gas turbine engine 10 can maintain normal operation.

With the shaft connection member 144 disconnected from the arm connection member 146, the one or more bearings 182 may generally support the shaft connection member 144, and accordingly the connecting arm 140 in the radial direction R with respect to the second shaft 48. Because the one or more bearings 182 are positioned between the shaft connection member 144 and the second shaft 48, the one or more bearings 182 may permit rotation of the second shaft 48 in the circumferential direction C with respect to the shaft connection member 144, such that minimal or no rotation force is imparted on the shaft connection member 144 from the second shaft 48.

In some embodiments, the gas turbine engine 10 includes a disconnection device 150. For example, in the embodiment depicted in FIG. 3A, the disconnection device 150 to a device support arm 151 and is positioned proximate to the frangible connection portion 132. In embodiments, the disconnection device 150 is positionable between an engaged position and a disengaged position. In the disengaged position, the disconnection device 150 is spaced apart from the connecting member 130 (e.g., the frangible connection portion 132 as shown in FIG. 3A). In the engaged position, the disconnection device 150 is engaged with the connecting member 130 (e.g., the frangible connection portion 132 as shown in FIG. 3A). By engaging the connecting member 130 (e.g., the frangible connection portion 132 as shown in FIG. 3A), the disconnection device 150 may fracture at least a portion of the connecting member 130, thereby disconnecting the electrical rotor component 112 from the second shaft 48, as described in greater detail herein. While in the embodiment depicted in FIG. 3A, the disconnection device 150 is positioned to engage the frangible connection portion 132, it should be understood that this is merely an example, and the disconnection device 150 may engage any portion of the connecting member 130. While the disconnection device 150 is described and depicted as fracturing the connecting member 130 via physical engagement (e.g., cutting or breaking), it should be understood that this is merely an example. For example, in some embodiments, the disconnection device 150 may engage the connecting member 130 in any suitable manner and may include an energy emitting device such as a laser or the like that may melt at least a portion of the connecting member 130.

In the instance that the electrical machine 110 fails, for example through a short circuit fault, the disconnection device 150 may move from the disengaged position to the engaged position, thereby engaging the frangible connection portion 132 and fracturing the frangible connection portion 132.

Figure 4:
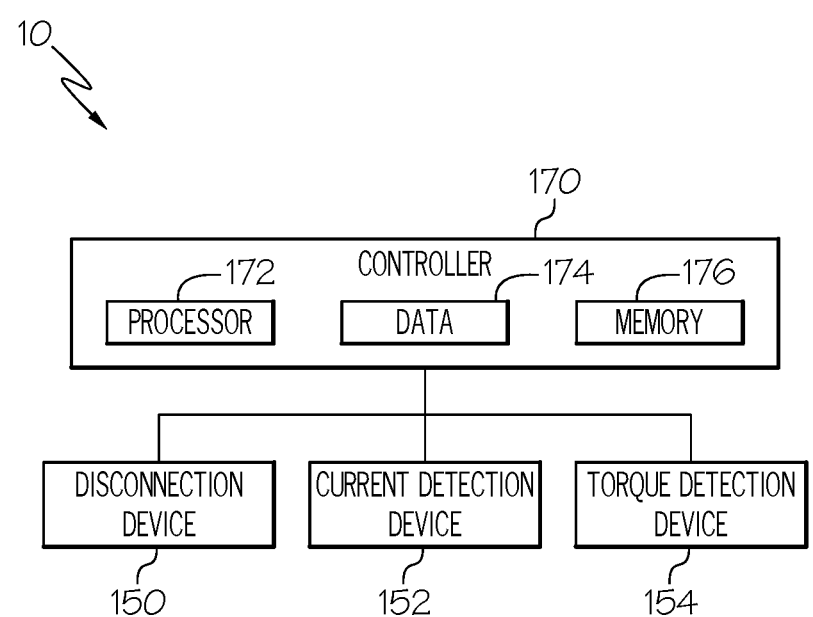
FIG. 4 schematically depicts a control diagram of the gas turbine engine of FIG. 1, according to one or more embodiments shown and described herein.

For example and referring to FIGS. 3A and 4, a control diagram of the gas turbine engine 10 is schematically depicted. In embodiments, the gas turbine engine system 10 includes a controller 170. As illustrated, the controller 170 includes a processor 172, a data storage component 174, and/or a memory component 176. The memory component 176 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the controller 170 and/or external to the controller 170.

The memory component 176 may store operating logic, analysis logic, and communication logic in the form of one or more computer readable and executable instruction sets. The analysis logic and the communication logic may each include a plurality of different pieces of logic, each of which may be embodied as a computer program, firmware, and/or hardware, as an example. A local interface is also included in the controller 170, and may be implemented as a bus or other communication interface to facilitate communication among the components of the controller 170.

The processor 172 may include any processing component operable to receive and execute instructions (such as from a data storage component 174 and/or the memory component 176). It should be understood that while the components in FIG. 4 are illustrated as residing within the controller 170, this is merely an example, and in some embodiments, one or more of the components may reside external to the controller 170. It should also be understood that, while the controller 170 is illustrated as a single device, this is also merely an example.

In embodiments, the controller 170 is communicatively coupled to one or more components of the gas turbine engine 10. For example, in the embodiment depicted in FIG. 4, the controller 170 is communicatively coupled to the disconnection device 150. For example, in embodiments, the controller 170 may send a signal or signals to the disconnection device 150, directing the disconnection device 150 to move from the disengaged position to the engaged position.

In some embodiments, the controller 170 is communicatively coupled to a current detection device 152. In embodiments, the current detection device 152 may be structurally configured to detect a current passing from and/or through the electrical machine 110. In some embodiments, the current detection device 152 is a circuit breaker. For example, in some embodiments, the current detection device 152 is a circuit breaker that is positionable between an open position and a closed position. In the closed position, the circuit breaker (e.g., the current detection device 152) may allow electrical current to pass through and/or from the electrical machine 110 (FIG. 1) through the circuit breaker. In the open position, the circuit breaker (e.g., the current detection device 152) may restrict current from passing through and/or from the electrical machine 110 (FIG. 1) through the circuit breaker.

In some embodiments, the gas turbine engine 10 may include a torque detection device 154 communicatively coupled to the controller 170 and structurally configured to detect a torque on the electrical rotor component 112 (FIG. 2). For example, in embodiments, the torque detection device 154 may include, for example and without limitation, a rotary torque sensor or the like that is structurally configured to detect torque applied to the electrical rotor component 112 (FIG. 2) by the second shaft 48 (FIG. 2) via the connecting member 130 (FIG. 2). The torque detection device 154, in embodiments, may send signals to the controller 170 indicative of a detected torque, as described in greater detail herein.

In some embodiments, the controller 170 may direct the disconnection device 150 to move from the disengaged position to the engaged position in response to receiving a signal from the electrical machine 110 indicative of a fault, such as a short circuit. In some embodiments, the electrical machine 110 may send a signal to the controller 170 indicating a fault via the current detection device 152. For example, upon detecting a current of electricity within the electrical machine 110 exceeding a predetermined threshold current (e.g., a current of electricity associated with a short circuit fault), the current detection device 152 may send a signal to the controller 170 indicating a fault of the electrical machine 110. In response to receiving the signal from the current detection device 152 indicating the fault of the electrical machine 110, the controller 170 may direct the disconnection device 150 to move from the disengaged position to the engaged position, thereby engaging the frangible connection portion 132 and disconnecting the electrical rotor component 112 from the second shaft 48.

In embodiments in which current detection device 152 is a circuit breaker, the current detection device 152 may send a signal to the controller 170 indicating that the circuit breaker is in the open position. As described above, in embodiments in which the current detection device 152 is a circuit breaker, the circuit breaker may move from the closed position to the open position in response to current passing from the electrical machine 110 exceeding a predetermined threshold current. In embodiments, the predetermined threshold current at which the circuit breaker (e.g., the current detection device 152) moves from the closed position to the open position may be associated with a current of electricity indicative of a short circuit of the electrical machine 110. In this way, the signal from the circuit breaker (e.g., the current detection device 152) that the circuit breaker is in the open position is indicative that the current passing from the electrical machine 110 exceeds the predetermined threshold current.

In embodiments in which the gas turbine engine 10 includes the torque detection device 154, the controller 170 may direct the disconnection device 150 to move from the disengaged position to the engaged position in response to receiving a signal from the torque detection device 154. For example, in embodiments, the controller 170 may direct the disconnection device 150 to move from the disengaged position to the engaged position in response to receiving a signal from the torque detection device 154 indicative of a detected torque that exceeds a predetermined torque threshold. In embodiments, the predetermined threshold torque may be associated with a torque applied to the electrical rotor component 112 in a short circuit condition.

Figure 5:
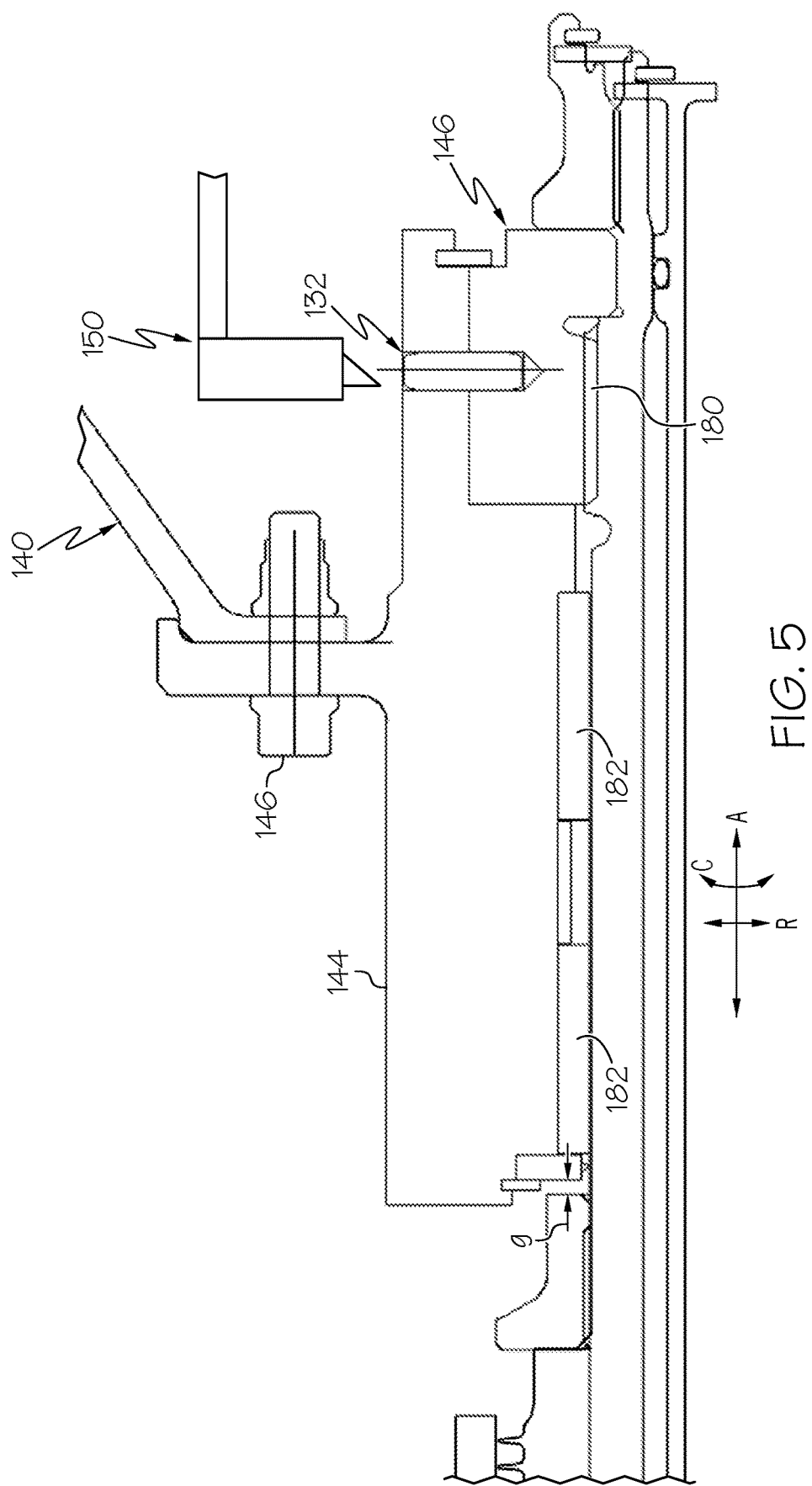
FIG. 5 schematically depicts an enlarged section view of another connecting member, according to one or more embodiments shown and described herein.

Referring to FIG. 5, an enlarged section view of another connecting member 130 is schematically depicted. Like the embodiment described above and depicted in FIGS. 3A-3C, the connecting member 130 includes the connecting arm 140, the shaft connection member 144 and the arm connection member 146. However, in the embodiment depicted in FIG. 5, the frangible connection portion 132 positioned between the shaft connection member 144 and the arm connection member 146 includes a shear pin. In embodiments, the shear pin (e.g., the frangible connection portion 132) is a pin that is structurally configured to fracture upon the application of a force exceeding the predetermined force. For example, in embodiments, the material of the shear pin (e.g., the frangible connection portion 132) and/or the cross-sectional area of the shear pin may be selected such that the shear pin may fracture upon the application of a force exceeding the predetermined force, thereby disconnecting the arm connection member 146 from the shaft connection member 144. In some embodiments, the gas turbine engine 10 may further include the disconnection device 150 that is positionable to engage the shear pin (e.g., the frangible connection portion 132) in the engaged position, thereby fracturing the shear pin.

Figure 6:
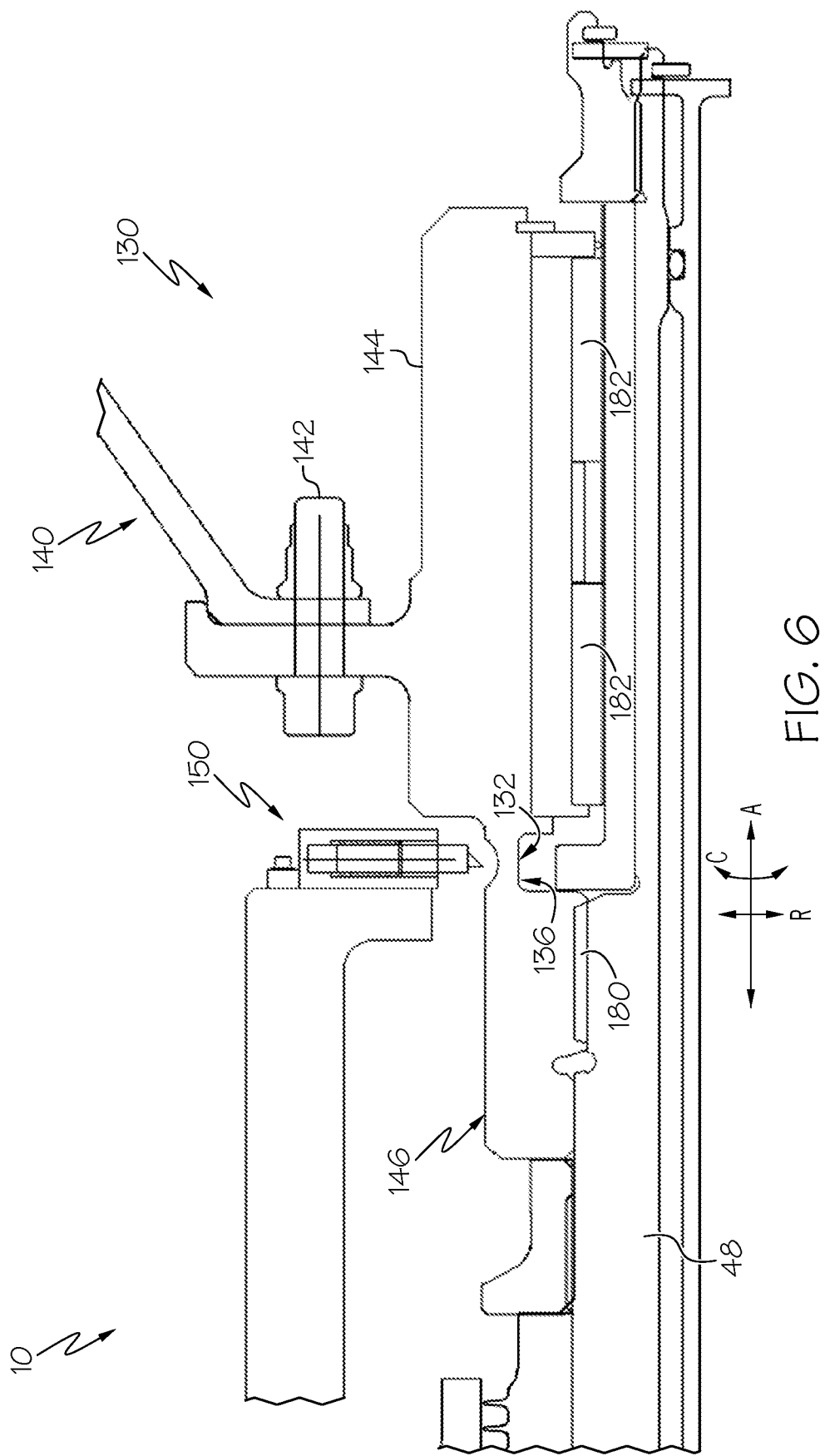
FIG. 6 schematically depicts an enlarged section view of another connecting member, according to one or more embodiments shown and described herein.

Referring to FIG. 6, an enlarged view of another connecting member 130 is schematically depicted. Like the embodiments described above and depicted in FIGS. 3A-5, the connecting member 130 includes the connecting arm 140, the shaft connection member 144 and the arm connection member 146 coupled to the shaft connection member 144 via the frangible connection portion 132. However, in the embodiment depicted in FIG. 6, the arm connection member 146 is positioned forward of the shaft connection member 144 in the axial direction A.

Figure 7:
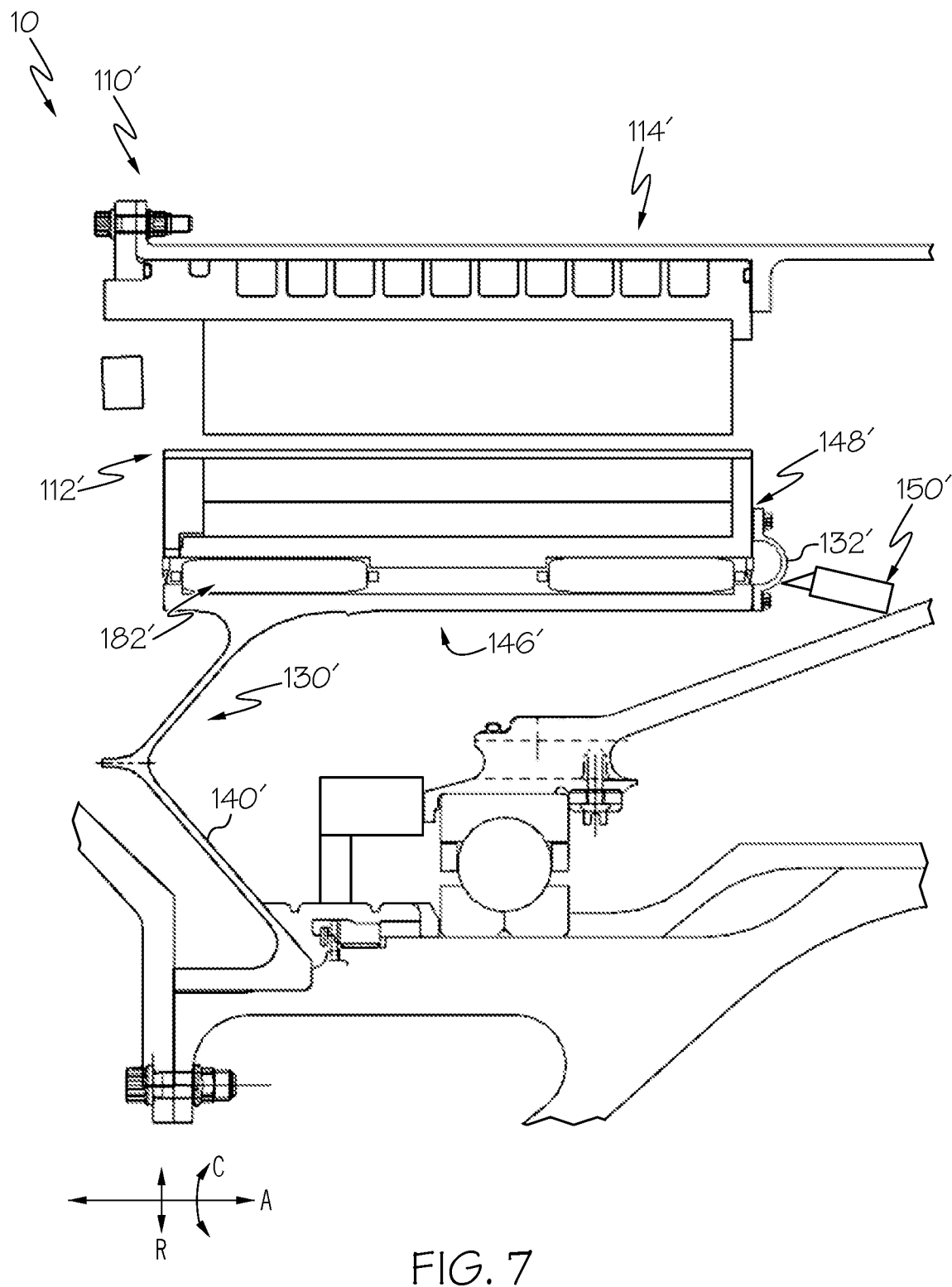
FIG. 7 schematically depicts a section view of a forward portion of the gas turbine engine of FIG. 1 including a forward electrical machine and a connecting member coupled to the rotary member, according to one or more embodiments shown and described herein.

Referring to FIGS. 1 and 7, a section view of the forward electrical machine 110' is schematically depicted. Like the embodiments of the aft electrical machine 110 described above and depicted in FIGS. 1-6, the forward electrical machine 110' generally includes the electrical rotor component 112' that rotates with respect to the electrical stator component 114'. Similarly, like the embodiments of the aft electrical machine 110 described above and depicted in FIGS. 1-6, the electrical rotor component 112' is coupled to the second shaft 48 through the connecting member 130' including the shaft connection member 144' and the arm connection member 146'. Further, the shaft connection member 144' and the arm connection member 146', in the embodiment depicted in FIG. 7, are coupled to one another through the frangible connection portion 132'. Also, like the embodiments of the aft electrical machine 110 described above and depicted in FIGS. 1-6, the disconnection device 150' may be selectively engagable with the frangible connection portion 132' to disconnect the shaft connection member 144' and the arm connection member 146', thereby disconnecting the electrical rotor component 112' from the second shaft 48.

In the embodiment depicted in FIG. 7, the one or more bearings 182' are positioned between the shaft connection member 144' and the arm connection member 146'. Upon fracture of the frangible connection portion 132', the connecting arm 140' and the arm connection member 146' may continue to rotate with the second shaft 48 in the circumferential direction C. The one or more bearings 182' may support the shaft connection member 144', allowing the arm connection member 146' to rotate with respect to the shaft connection member 144' in the circumferential direction, thereby imparting minimal force in the circumferential direction C.

Figure 8:
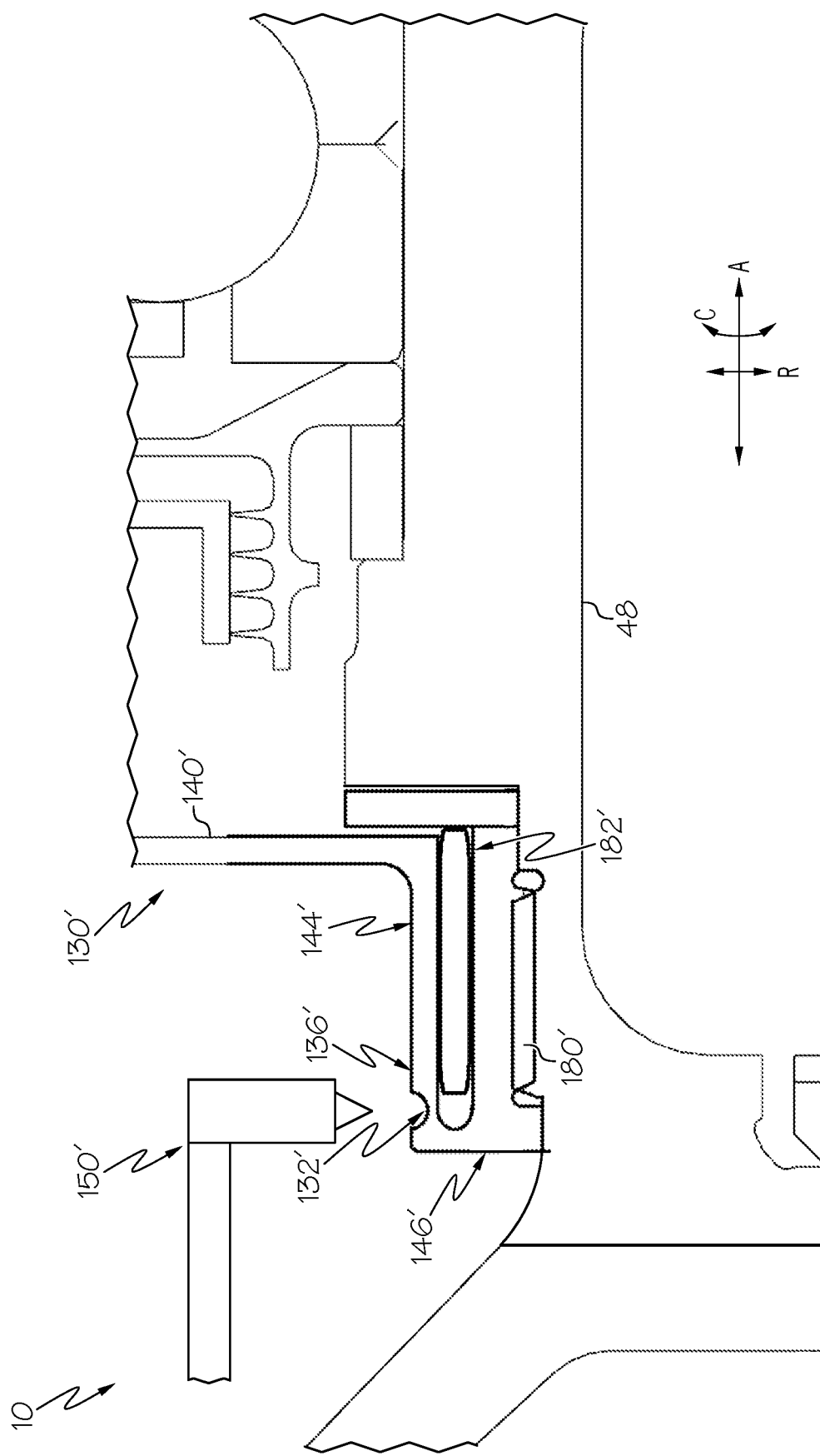
FIG. 8 schematically depicts an enlarged section view of another connecting member, according to one or more embodiments shown and described herein.

Referring to FIGS. 1 and 8, an enlarged section view of another connecting member 130' coupling the forward electrical machine 110' to the second shaft 48 is schematically depicted. Like the embodiment described above and depicted in FIG. 7, the connecting member 130' includes the connecting arm 140', and the shaft connection member 144' coupled to the arm connection member 146' via the frangible connection portion 132'. Further the one or more bearings 182' may be positioned between the shaft connection member 144' and the arm connection member 146'. However, in the embodiment depicted in FIG. 8, the frangible connection portion 132' defines a frangible connection portion cross-sectional area that is less than a nominal cross-sectional area of a nominal connection portion 134', similar to the embodiment described above and depicted in FIG. 3A. In the embodiment depicted in FIG. 8, a spline 180' may be positioned between the arm connection member 146' and the second shaft 48, such that the arm connection member 146' generally rotates with the second shaft 48 in the circumferential direction C.

Figure 9:
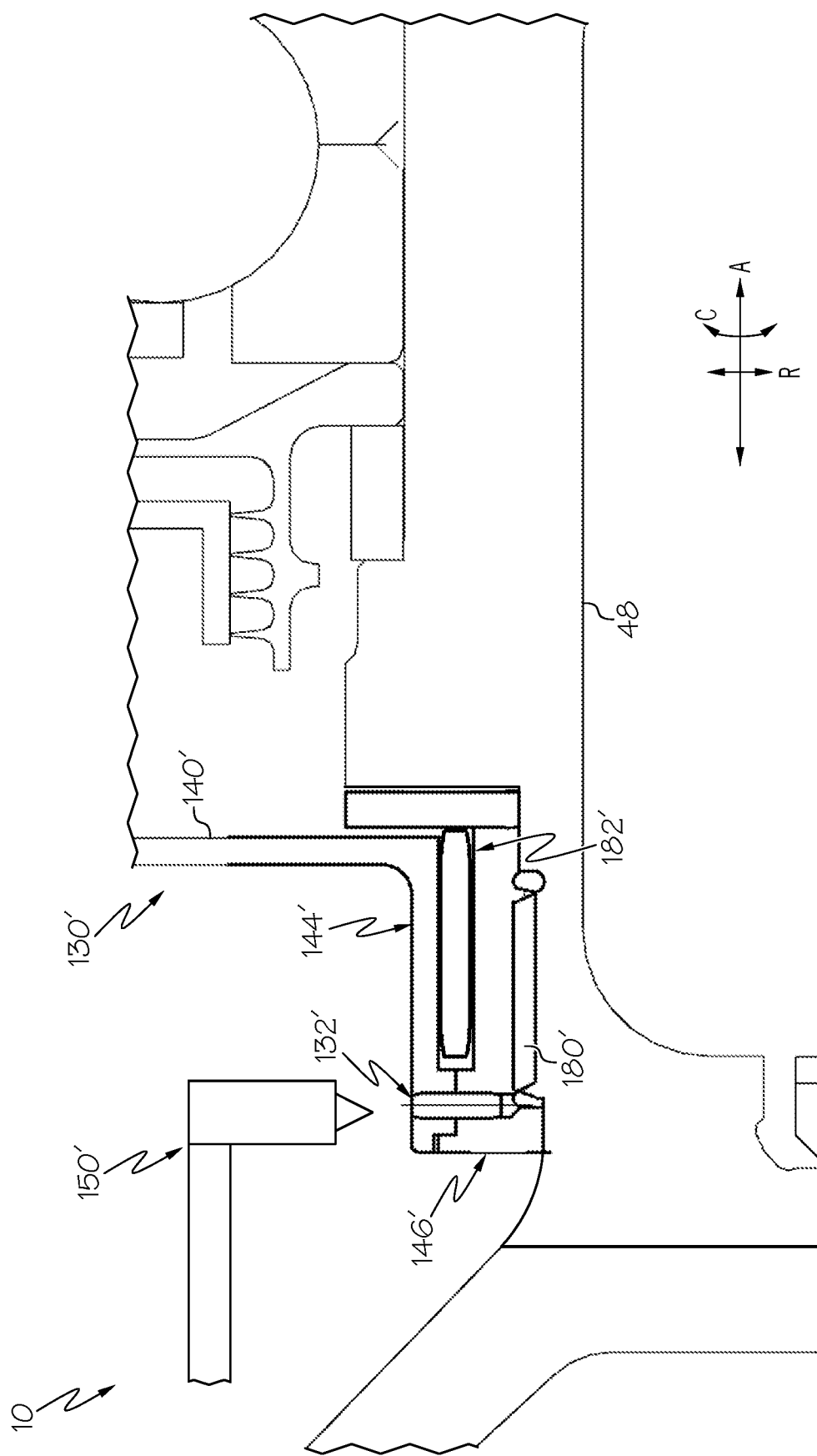
FIG. 9 schematically depicts an enlarged section view of another connecting member, according to one or more embodiments shown and described herein.

Referring to FIGS. 1 and 9, an enlarged section view of another connecting member 130' coupling the forward electrical machine 110' to the second shaft 48 is schematically depicted. Like the embodiment described above and depicted in FIG. 8, the connecting member 130' includes the connecting arm 140', and the shaft connection member 144' coupled to the arm connection member 146' via the frangible connection portion 132'. Further the one or more bearings 182' may be positioned between the shaft connection member 144' and the arm connection member 146'. However, in the embodiment depicted in FIG. 9, the frangible connection portion 132' comprises a shear pin, similar to the embodiment described above and depicted in FIG. 5.

Figure 10:
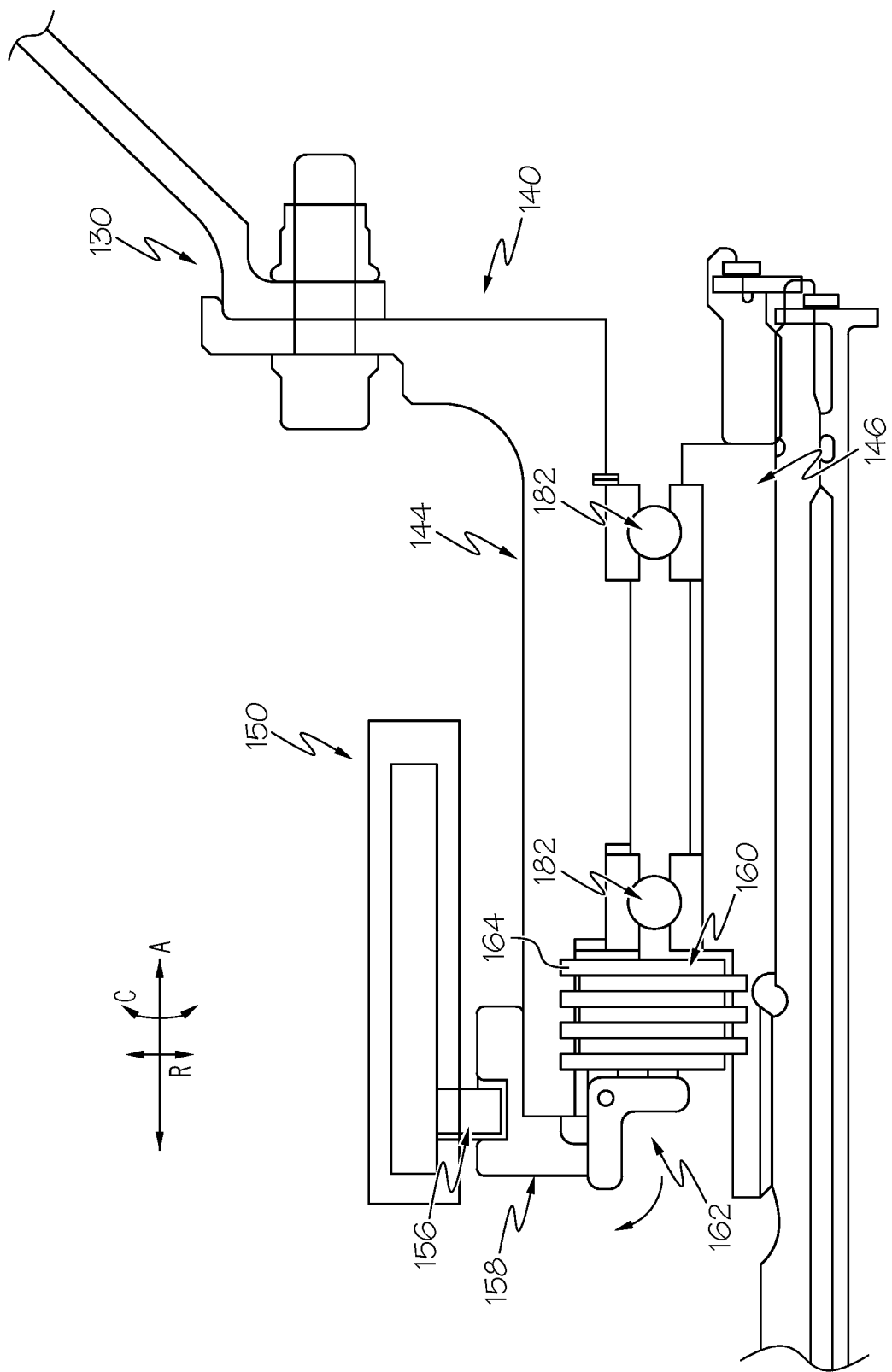
FIG. 10 schematically depicts an enlarged section view of another connecting member, according to one or more embodiments shown and described herein.

Referring to FIGS. 1 and 10, a section view of another connecting member 130 is schematically depicted. Similar to the embodiments described above and depicted in FIGS. 1-9, the connecting member 130 includes the connecting arm 140, the shaft connection member 144 and the arm connection member 146. However, in the embodiment depicted in FIG. 10, the shaft connection member 144 and the arm connection member 146 are selectively coupled to one another through a clutch 160. In the embodiment depicted in FIG. 10, the clutch 160 includes one or more engagable members 164 that are selectively engagable with the shaft connection member 144 and the arm connection member 146. For example, in embodiments, the one or more engagable members 164 may be positionable in an engaged position as shown in FIG. 10, in which the one or more engagable members 164 engage the shaft connection member 144 and the arm connection member 146. The one or more engagable members 164 may be positionable in a disengaged position, in which the one or more engagable members 164 are spaced apart from at least one of the shaft connection member 144 and the arm connection member 146, such that the shaft connection member 144 is no longer driven to rotate via the arm connection member 146. For example, in some embodiments, the one or more engagable members 164 may be expandable in the radial direction R to engage the shaft connection member 144 and the arm connection member 146. In some embodiments, the one or more engagable members 164 can be movable in any suitable manner (e.g., in the axial direction A) to selectively engage the shaft connection member 144 and the arm connection member 146 and may include any suitable shape for engaging the shaft connection member and the arm connection member 146, such as a spline or the like.

In embodiments, the one or more engagable members 164 are movable between the engaged position and the disengaged position via the disconnection device 150. For example, in some embodiments, the disconnection device 150 may be selectively engaged with the clutch 160 via one or more engagement arms 156, 158, 162. In the embodiment depicted in FIG. 10, a pivoting engagement arm 162 is selectively engaged with the clutch 160 and maintains the one or more engagable members 164 in the engaged position. The pivoting engagement arm 162 is engaged with the disconnection device 150 through a first engagement arm 156 and a second engagement arm 158. The disconnection device 150 may move the first engagement arm 156, thereby allowing the second engagement arm 158 to move and allowing the pivoting engagement arm 162 to disengage from the clutch 160, thereby allowing the one or more engagable members 164 to disengage from at least one of the arm connection member 146 and the shaft connection member 144. While in the embodiment depicted in FIG. 10, the disconnection device 150 is engaged with the clutch 160 through the one or more engagement arms 156, 158, 162, it should be understood that this is merely an example, and the disconnection device 150 may be engaged with the clutch 160 in any suitable manner to move the one or more engagable members 164 between the engaged position and the disengaged position.

Figure 11:
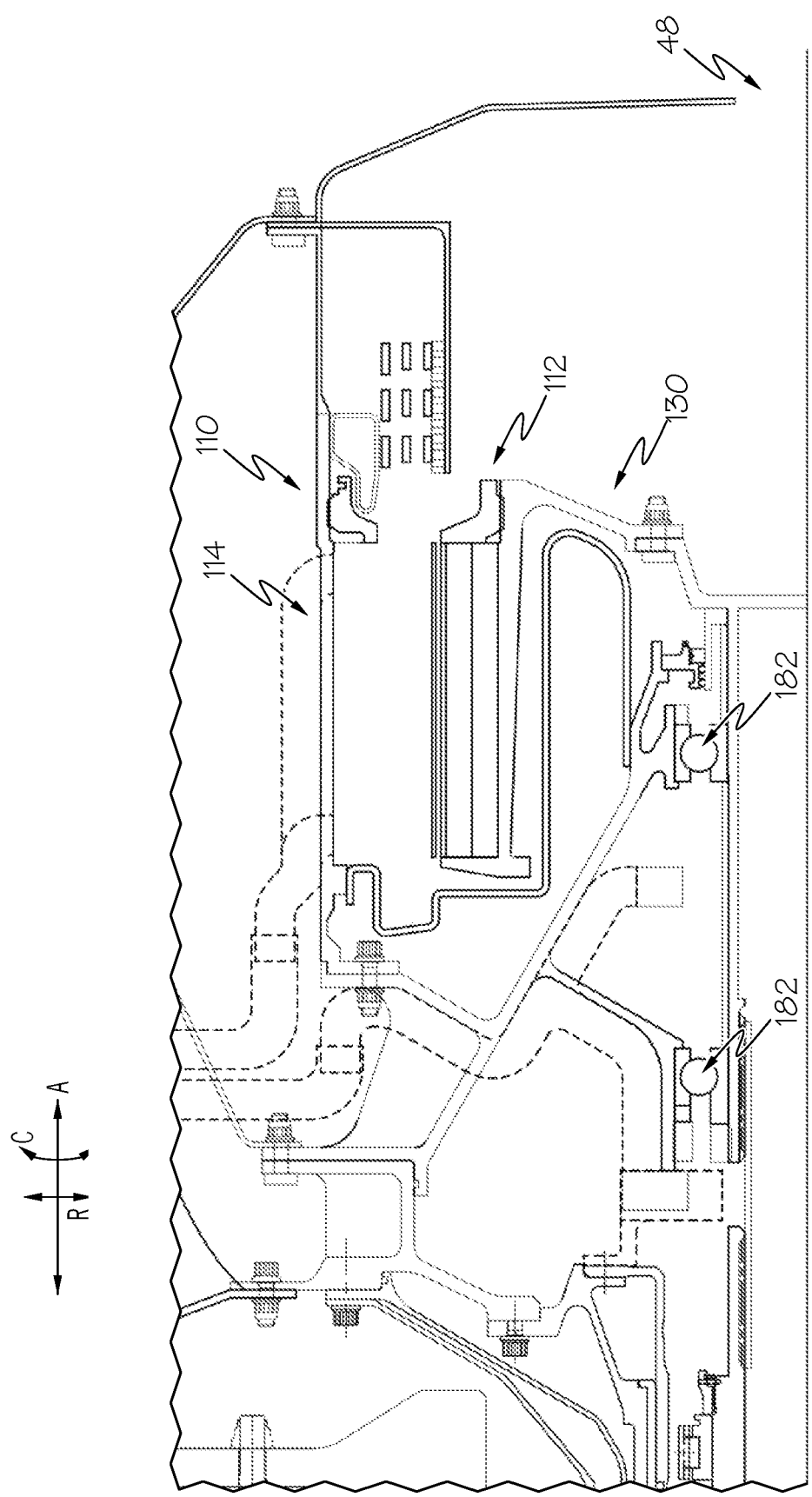
FIG. 11 schematically depicts an enlarged section view of another connecting member, according to one or more embodiments shown and described herein.

Referring to FIG. 11, section view of another electrical machine 110 is schematically depicted. Similar to the embodiments described above and depicted in FIGS. 1-10, the electrical machine 110 includes the electrical rotor component 112 that is coupled to the second shaft 48, and the electrical stator component 114. However, in the embodiment depicted in FIG. 11, the electrical stator component 114 is positioned outward of the electrical rotor component 112 in the radial direction R.

Accordingly, it should now be understood that embodiments described herein are generally directed to gas turbine engines that include embedded electrical machines. The embedded electrical machines may generally include electrical rotor components that are driven by a rotary member of the gas turbine engine. However, in the instance of some faults in the electrical machines, the electrical rotor components may apply a torque to the rotary member, which may be undesirable for a number of reasons. Embodiments of the present disclosure are directed to systems and methods for disconnecting an embedded electrical machine from a rotary member, for example, in the instance of a fault of the electrical machine.

As used herein, the singular forms "a," "an" and "the" include plural referents unless the context clearly dictates otherwise. Thus, for example, reference to "a" component includes aspects having two or more such components, unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" may include any values within ten percent of a particular value, such as within five percent of a particular value, such as within two percent of a particular value, such as within one percent of a particular value.

Directional terms as used herein—for example up, down, right, left, front, back, top, bottom, upper, lower,—are made only with reference to the figures as drawn and are not intended to imply absolute orientation unless otherwise expressly stated. The terms "axial" and "longitudinal" both refer to a direction that is parallel to a centerline the gas turbine engine, while "radial" refers to a direction perpendicular to the longitudinal direction. The terms "tangential" and "circumferential" refer to a direction mutually perpendicular to both the radial and longitudinal directions. The terms "forward" or "front" refer to a location upstream in airflow passing through or around a component during operation, and the terms "aft" or "rear" refer to a location downstream during operation. These directional terms are used merely for convenience in the description and also do not require a particular orientation of the structures described thereby.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Further aspects are provided by the subject matter in the following clauses:

In a first aspect A1, the present disclosure provides a gas turbine engine comprising a compressor section and a turbine section arranged in serial flow order, the compressor section and the turbine section together defining a core airflow path, a rotary member rotatable within at least a portion of the compressor section and with at least a portion of the turbine section, a fan coupled to the rotary member, an electrical machine positioned at least partially inward of the core airflow path in a radial direction, the electrical machine comprising an electrical rotor component and an electrical stator component, wherein the electrical rotor component is coupled to the rotary member, a connecting member positioned between the electrical machine and the rotary member, wherein the connecting member couples the electrical rotor component to the rotary member, a disconnection device that is positionable between a disengaged position, in which the disconnection device is disengaged from the connecting member, and an engaged position, in which the disconnection device is engaged with the connecting member, and a controller communicatively coupled to the electrical machine and the disconnection device, the controller comprising a processor and a computer readable and executable instruction set, which, when executed, causes the processor to receive a signal from the electrical machine indicative of a fault, and in response to receiving the signal from the electrical machine indicative of the fault, direct the disconnection device to move from the disengaged position to the engaged position, thereby disconnecting the electrical rotor component from the rotary member.

In a second aspect A2, the present disclosure provides the gas turbine engine of any preceding clause, wherein the electrical machine comprises a current detection device communicatively coupled to the controller.

In a third aspect A3, the present disclosure provides the gas turbine engine of any preceding clause, wherein the signal from the electrical machine indicative of the fault comprises a signal from the current detection device indicative of a current passing from the electrical machine that exceeds a predetermined threshold current.

In a fourth aspect A4, the present disclosure provides the gas turbine engine of any preceding clause, wherein the current detection device comprises a circuit breaker communicatively coupled to the controller, wherein the circuit breaker is positionable between a closed position, in which electrical current passes through the circuit breaker, and an open position, in which electrical current is restricted from passing through the circuit breaker, and wherein the circuit breaker is structurally configured to move from the closed position to the open position in response to the electrical current comprising a current above a predetermined threshold current.

In a fifth aspect A5, the present disclosure provides the gas turbine engine of any preceding clause, wherein the signal from the electrical machine indicative of the fault comprises a signal from the circuit breaker that the circuit breaker is in the open position.

In a sixth aspect A6, the present disclosure provides the gas turbine engine of any preceding clause, wherein the electrical machine further comprises a torque detection device communicatively coupled to the controller and structurally configured to detect a torque on the electrical rotor component.

In a seventh aspect A7, the present disclosure provides the gas turbine engine of any preceding clause, wherein the signal from the electrical machine indicative of the fault comprises a signal from the torque detection device indicative of a detected torque that exceeds a predetermined threshold torque.

In an eighth aspect A8, the present disclosure provides the gas turbine engine of any preceding clause, wherein the electrical machine is positioned at least partially within a forward cone positioned forward of the turbine section in an axial direction.

In a ninth aspect A9, the present disclosure provides the gas turbine engine of any preceding clause, wherein the electrical machine is positioned at least partially within a tail cone rearward of the compressor section in an axial direction.

In a tenth aspect A10, the present disclosure provides the gas turbine engine of any preceding clause, wherein the connecting member comprises a frangible connection portion and a nominal connection portion, wherein the frangible connection portion is structurally configured to fracture upon the application of a predetermined force, and wherein the frangible connection portion defines a frangible material strength that is less than a nominal material strength of the nominal connection portion.

In an eleventh aspect A11, the present disclosure provides the gas turbine engine of any preceding clause, wherein the frangible connection portion comprises a shear pin structurally configured to fracture upon the application of the predetermined force.

In a twelfth aspect A12, the present disclosure provides the gas turbine engine of any preceding clause, wherein the frangible connection portion defines a frangible connection portion cross-sectional area, and the nominal connection portion defines a nominal connection portion cross-sectional area, wherein the frangible connection portion cross-sectional area is less than the nominal connection portion cross-sectional area.

In a thirteenth aspect A13, the present disclosure provides the gas turbine engine of any preceding clause, wherein the disconnection device engages the frangible connection portion in the engaged position.

In a fourteenth aspect A14, the present disclosure provides the gas turbine engine of any preceding clause, wherein the disconnection device comprises an energy emitting device that emits energy on the connecting member in the engaged position.

In a fifteenth aspect A15, the present disclosure provides a gas turbine engine comprising a compressor section and a turbine section arranged in serial flow order, the compressor section and the turbine section together defining a core airflow path, a rotary member rotatable within at least a portion of the compressor section and with at least a portion of the turbine section, a fan coupled to the rotary member, an electrical machine positioned at least partially inward of the core airflow path in a radial direction, the electrical machine comprising an electrical rotor component and an electrical stator component, wherein the electrical rotor component is coupled to the rotary member, a connecting member positioned between the electrical machine and the rotary member, wherein the connecting member couples the electrical rotor component to the rotary member, wherein the connecting member comprises a frangible connection portion and a nominal connection portion, wherein the frangible connection portion is structurally configured to fracture upon the application of a predetermined force, and wherein the frangible connection portion defines a frangible material strength that is less than a nominal material strength of the nominal connection portion.

In a sixteenth aspect A16, the present disclosure provides the gas turbine engine of any preceding clause, wherein the frangible connection portion comprises a shear pin structurally configured to fracture upon the application of the predetermined force.

In a seventeenth aspect A17, the present disclosure provides the gas turbine engine of any preceding clause, wherein the frangible connection portion defines a frangible connection portion cross-sectional area, and the nominal connection portion defines a nominal connection portion cross-sectional area, wherein the frangible connection portion cross-sectional area is less than the nominal connection portion cross-sectional area.

In an eighteenth aspect A18, the present disclosure provides a method for operating a gas turbine engine, the method comprising rotating a rotary member within at least a portion of a compressor section and with at least a portion of a turbine section that are arranged in serial flow order and define a core airflow path, thereby rotating a fan coupled to the rotary member, and an electrical rotor component of an electrical machine, wherein the electrical rotor component is coupled to the rotary member, and wherein the electrical machine is positioned at least partially inward of the core airflow path in a radial direction, and the electrical machine comprises the electrical rotor component and an electrical stator component, detecting a fault within the electrical machine, and in response to detecting the fault within the electrical machine, disconnecting a connecting member that couples the electrical rotor component to the rotary member with a disconnection device, thereby disconnecting the electrical rotor component from the rotary member.

In an eighteenth aspect A18, the present disclosure provides the method of any preceding clause, wherein the electrical machine further comprises a circuit breaker, wherein the circuit breaker is positionable between a closed position, in which electrical current passes through the circuit breaker, and an open position, in which electrical current is restricted from passing through the circuit breaker, and wherein the method further comprises detecting an amount of current passing through the electrical machine, and in response to the detected current exceeding a predetermined threshold current, moving the circuit breaker from the closed position to the open position.

In a nineteenth aspect A19, the present disclosure provides the method of any preceding clause, further comprising determining whether the circuit breaker is in the open position, and wherein detecting the fault within the electrical machine comprises determining that the circuit breaker is in the open position.

In a twentieth aspect A20, the present disclosure provides the method of any preceding clause, wherein disconnecting the connecting member comprises moving one or more engagement members of a clutch from an engaged position, in which the one or more engagement members engage a shaft connection member and an arm connection member of the connecting member, to a disengaged position, in which the one or more engagement members are spaced apart from at least one of the shaft connection member and the arm connection member.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A gas turbine engine comprising:
    a compressor section and a turbine section arranged in serial flow order, the compressor section and the turbine section together defining a core airflow path;
    a rotary member rotatable within at least a portion of the compressor section and with at least a portion of the turbine section;
    a fan coupled to the rotary member;
    an electrical machine positioned at least partially inward of the core airflow path in a radial direction, the electrical machine comprising an electrical rotor component and an electrical stator component, wherein the electrical rotor component is coupled to the rotary member;
    a connecting member positioned between the electrical machine and the rotary member, wherein the connecting member couples the electrical rotor component to the rotary member;
    a disconnection device that is positionable between a disengaged position, in which the disconnection device is disengaged from the connecting member, and an engaged position, in which the disconnection device is engaged with the connecting member;
    one or more bearings located between the connecting member and the rotary member, the one or more bearings supporting the connecting member with respect to the rotary member and permitting rotation of the rotary member with respect to the connecting member; and
    a controller communicatively coupled to the electrical machine and the disconnection device, the controller comprising a processor and a computer readable and executable instruction set, which, when executed, causes the processor to:
        receive a signal from the electrical machine indicative of a fault; and
        in response to receiving the signal from the electrical machine indicative of the fault, direct the disconnection device to move from the disengaged position to the engaged position, thereby disconnecting the electrical rotor component from the rotary member, the one or more bearings allowing the rotary member to rotate relative to the connecting member and the electrical rotor component when the electrical rotor component is disconnected from the rotary member.

2. The gas turbine engine of claim 1, wherein the electrical machine comprises a current detection device communicatively coupled to the controller.

3. The gas turbine engine of claim 2, wherein the signal from the electrical machine indicative of the fault comprises a signal from the current detection device indicative of a current passing from the electrical machine that exceeds a predetermined threshold current.

4. The gas turbine engine of claim 2, wherein the current detection device comprises a circuit breaker communicatively coupled to the controller, wherein the circuit breaker is positionable between a closed position, in which electrical current passes through the circuit breaker, and an open position, in which electrical current is restricted from passing through the circuit breaker, and wherein the circuit breaker is structurally configured to move from the closed position to the open position in response to the electrical current comprising a current above a predetermined threshold current.

5. The gas turbine engine of claim 4, wherein the signal from the electrical machine indicative of the fault comprises a signal from the circuit breaker that the circuit breaker is in the open position.

6. The gas turbine engine of claim 1, wherein the electrical machine further comprises a torque detection device communicatively coupled to the controller and structurally configured to detect a torque on the electrical rotor component.

7. The gas turbine engine of claim 6, wherein the signal from the electrical machine indicative of the fault comprises a signal from the torque detection device indicative of a detected torque that exceeds a predetermined threshold torque.

8. The gas turbine engine of claim 1, wherein the electrical machine is positioned at least partially within a forward cone positioned forward of the turbine section in an axial direction.

9. The gas turbine engine of claim 1, wherein the electrical machine is positioned at least partially within a tail cone rearward of the compressor section in an axial direction.

10. The gas turbine engine of claim 1, wherein the connecting member comprises a frangible connection portion and a nominal connection portion, wherein the frangible connection portion is structurally configured to fracture upon an application of a predetermined force, and wherein the frangible connection portion defines a frangible material strength that is less than a nominal material strength of the nominal connection portion.

11. The gas turbine engine of claim 10, wherein the frangible connection portion comprises a shear pin structurally configured to fracture upon the application of the predetermined force.

12. The gas turbine engine of claim 10, wherein the frangible connection portion defines a frangible connection portion cross-sectional area, and the nominal connection portion defines a nominal connection portion cross-sectional area, wherein the frangible connection portion cross-sectional area is less than the nominal connection portion cross-sectional area.

13. The gas turbine engine of claim 10, wherein the disconnection device engages the frangible connection portion in the engaged position.

14. The gas turbine engine of claim 1, wherein the disconnection device comprises an energy emitting device that emits energy on the connecting member in the engaged position.

15. The gas turbine engine of claim 1, wherein the connecting member includes a shaft connection member coupled to the electrical rotor component and an arm connection member coupled to the rotary member, the shaft connection member and the arm connection member coupling the connecting member to the rotary member, wherein disconnecting the electrical rotor component from the rotary member includes disconnecting the shaft connection member from the arm connection member, the one or more bearings supporting the shaft connection member with respect to the rotary member, thereby supporting the connecting member, after the shaft connection member has been disconnected from the arm connection member.

16. A gas turbine engine comprising:
a compressor section and a turbine section arranged in serial flow order, the compressor section and the turbine section together defining a core airflow path;
a rotary member rotatable within at least a portion of the compressor section and with at least a portion of the turbine section;
a fan coupled to the rotary member;
an electrical machine positioned at least partially inward of the core airflow path in a radial direction, the electrical machine comprising an electrical rotor component and an electrical stator component, wherein the electrical rotor component is coupled to the rotary member;
a connecting member positioned between the electrical machine and the rotary member, wherein the connecting member couples the electrical rotor component to the rotary member, wherein the connecting member comprises a frangible connection portion and a nominal connection portion, wherein the frangible connection portion is structurally configured to fracture upon an application of a predetermined force thereby disconnecting the electrical rotor component from the rotary member, and wherein the frangible connection portion defines a frangible material strength that is less than a nominal material strength of the nominal connection portion; and
one or more bearings located between the connecting member and the rotary member, the one or more bearings supporting the connecting member with respect to the rotary member and permitting rotation of the rotary member with respect to the connecting member, the one or more bearings allowing the rotary member to rotate relative to the connecting member and the electrical rotor component when the electrical rotor component is disconnected from the rotary member.

17. The gas turbine engine of claim 16, wherein the frangible connection portion comprises a shear pin structurally configured to fracture upon the application of the predetermined force.

18. The gas turbine engine of claim 16, wherein the frangible connection portion defines a frangible connection portion cross-sectional area, and the nominal connection portion defines a nominal connection portion cross-sectional area, wherein the frangible connection portion cross-sectional area is less than the nominal connection portion cross-sectional area.

19. A method for operating a gas turbine engine, the method comprising:
rotating a rotary member within at least a portion of a compressor section and with at least a portion of a turbine section that are arranged in serial flow order and define a core airflow path, thereby rotating:
a fan coupled to the rotary member; and
an electrical rotor component of an electrical machine, wherein the electrical rotor component is coupled to the rotary member, and wherein the electrical machine is positioned at least partially inward of the core airflow path in a radial direction, and the electrical machine comprises the electrical rotor component and an electrical stator component;
detecting a fault within the electrical machine;
in response to detecting the fault within the electrical machine, disconnecting a connecting member that couples the electrical rotor component to the rotary member with a disconnection device, thereby disconnecting the electrical rotor component from the rotary member; and
rotating the rotary member relative to the connecting member and the electric rotor component using one or more bearings when the electric rotor component is disconnected from the rotary member, the one or more bearings being located between the connecting member and the rotary member and supporting the connecting member with respect to the rotary member.

20. The method of claim 19, wherein the electrical machine further comprises a circuit breaker, wherein the circuit breaker is positionable between a closed position, in which electrical current passes through the circuit breaker, and an open position, in which electrical current is restricted from passing through the circuit breaker, and wherein the method further comprises:
detecting an amount of current passing through the electrical machine; and
in response to the detected current exceeding a predetermined threshold current, moving the circuit breaker from the closed position to the open position.

21. The method of claim 20, further comprising:
determining whether the circuit breaker is in the open position; and
wherein detecting the fault within the electrical machine comprises determining that the circuit breaker is in the open position.

22. The method of claim 19, wherein disconnecting the connecting member comprises moving one or more engagement members of a clutch from an engaged position, in which the one or more engagement members engage a shaft connection member and an arm connection member of the connecting member, to a disengaged position, in which the one or more engagement members are spaced apart from at least one of the shaft connection member and the arm connection member.

23. The method of claim 19, wherein the connecting member includes a shaft connection member coupled to the electrical rotor component and an arm connection member coupled to the rotary member, the shaft connection member and the arm connection member coupling the connecting member to the rotary member, wherein disconnecting the connecting member includes disconnecting a shaft connection member from an arm connection member, the one or more bearings supporting the shaft connection member with respect to the rotary member, thereby supporting the connecting member, after the shaft connection member has been disconnected from the arm connection member.

* * * * *